(12) United States Patent
Nervig et al.

(10) Patent No.: US 6,454,208 B1
(45) Date of Patent: Sep. 24, 2002

(54) AUTOMATED GALLEY-CART STORAGE SYSTEM

(75) Inventors: Steven N. Nervig, Kent; Craig P. Sundine, Snohomish; George D. Sherotsky, Renton, all of WA (US)

(73) Assignee: The Boeing Company, Seattle, WA (US)

( * ) Notice: Subject to any disclaimer, the term of this patent is extended or adjusted under 35 U.S.C. 154(b) by 49 days.

(21) Appl. No.: 09/747,378

(22) Filed: Dec. 22, 2000

(51) Int. Cl.[7] ............................................... B64D 11/04
(52) U.S. Cl. ................................ 244/118.1; 244/118.2; 244/118.5; 244/118.6
(58) Field of Search ....................... 244/118.5, 118.6, 244/118.1, 118.2

(56) References Cited

U.S. PATENT DOCUMENTS

| | | |
|---|---|---|
| 3,517,899 A | 6/1970 | Vernon |
| 3,615,003 A | 10/1971 | Rust |
| 3,999,630 A | 12/1976 | McPhee |
| 4,022,404 A * | 5/1977 | Greiss .......................... 186/40 |
| 4,055,317 A * | 10/1977 | Greiss ...................... 244/118.5 |
| RE32,176 E | 6/1986 | Vernon |
| 4,653,707 A | 3/1987 | Hamilton et al. |
| 4,660,787 A | 4/1987 | Sprenger et al. |
| 5,074,496 A | 12/1991 | Rezag et al. |
| 5,322,244 A | 6/1994 | Dallmann et al. |
| 5,474,260 A | 12/1995 | Schwertfeger et al. |
| 5,496,000 A | 3/1996 | Mueller |
| 5,542,626 A | 8/1996 | Beuck et al. |
| 5,727,654 A | 3/1998 | Roessner et al. |
| 6,305,643 B1 * | 10/2001 | Sankrithi .................. 244/118.1 |
| 6,340,136 B1 * | 1/2002 | Luria ....................... 244/118.1 |

FOREIGN PATENT DOCUMENTS

DE      42 08 438 A1      9/1993

* cited by examiner

Primary Examiner—Charles T. Jordan
Assistant Examiner—Stephen A Holzen
(74) Attorney, Agent, or Firm—Christensen O'Connor Johnson Kindness PLC

(57) ABSTRACT

An automated galley-cart storage system for use in a structure having a lower area and an upper level. The storage system includes a container (22) sized to hold a predetermined maximum number of galley-carts (20) in lateral rows. An equal number of cart pallets (34) are provided as well. Galley-carts are positionable on the pallets within the container. A cart elevator (64) is located within the container and is used to lift and lower cart pallets through an upright passage (60) connecting the container with the upper level. An elevated transfer system (36) is located within the container to move the cart pallets in a predefined pattern within the container. The pattern passes through the elevator. During use, an operator may retrieve unused galley carts from the container and store used galley-carts in their place.

17 Claims, 5 Drawing Sheets

AUTOMATED GALLEY-CART STORAGE SYSTEM

FIELD OF THE INVENTION

The present invention relates to cart storage systems used in confined spaces; and more particularly, to cart storage systems for use with on-board galleys of commercial jet aircraft or other vehicles or structures.

BACKGROUND OF THE INVENTION

Large commercial aircraft have galley areas that can occupy significant passenger-level floor space. While a large galley area to support meal service is generally desirable from a passenger perspective, most airline operators would prefer to fill such space with passenger seats that generate additional revenue. Thus, the value of the space needed for aircraft galley-carts creates a disincentive for airline operators to provide food service. The problem is more critical in smaller aircraft that are capable of longer range flights, but yet are not capable of housing all of the galley-carts required for the additional meal service needed on these longer flights. In such cases, an operator can choose to limit the length of the flight or can choose to provide less food service. Neither option is particularly good. Thus, a need exists for a more efficient aircraft galley storage arrangement that lets airline operators make optimum use of their aircraft's' passenger-level space and allows them to offer sufficient meal service to their passengers. The present invention is directed to fulfilling these needs and others as described below.

SUMMARY OF THE INVENTION

In accordance with aspects of the present invention, an automated galley-cart storage system is provided for use in a structure having a lower area and an upper level. The storage system includes a container sized to hold a predetermined maximum number of galley-carts in lateral rows. An equal number or less of cart pallets are provided as well. The galley-carts are positionable on the cart pallets within the container. A cart elevator is located within the container and is used to lift and lower cart pallets through an upright passage connecting the container with the upper level. An elevated transfer system is located within the container to move the cart pallets laterally in a predefined pattern within the container, such pattern passing through the elevator.

In accordance with aspects of this invention during use, an operator may retrieve unused galley carts from the container and store used galley-carts in their place. This is accomplished by an operator using a control system to operate the transfer system to move cart pallets along the predefined pattern such that a cart pallet with an unused galley-cart is located at the elevator. Once at the elevator, the control system is used to operate the elevator to lift the pallet and corresponding unused galley-cart through the passage and into the upper level. Once at the upper level, the unused galley-cart is moved from the pallet. A used galley-cart may be returned to the container by reverse sequence.

In accordance with further aspects of this invention, a control panel is located within the galley station for use by an operator. A heat exchanger is located within the container generally below the elevated transfer system and is used to maintain the container at a desired temperature.

In accordance with other aspects of this invention, in one embodiment, the elevated transfer system includes an endless belt, a linear pusher driving the endless belt, and a powered pusher. The belt and linear pusher are located in the container and provided to move the cart pallets in a lateral direction. The powered pusher is located in the container and provided to move the cart pallets in a transverse direction. In another embodiment, the elevated transfer system includes a plurality of drive sprockets located throughout the container and a pulley system to synchronously rotate the plurality of drive sprockets. Each cart pallet includes a rack affixed to its underside and formed to continuously engage one or more of the sprockets in both longitudinal and lateral directions.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is an automated galley-cart storage system for use storing and retrieving galley-carts during flight. The storage system includes a container located in an aircraft lower lobe and an upright cart elevator extending between the container and a passenger deck. Unused galley carts are placed in the container and are retrieved, used, and then returned to the container during flight. In this manner, the galley-carts are cycled between the passenger deck and the container. This allows for a significant decrease in the amount of storage space needed on the passenger deck for galley-carts (and resultant increase in revenue passenger seats), or alternatively for a significant increase in the number of galley-carts available for use. The present invention is described herein as applied to the galley of an aircraft. However, it is to be understood that the present invention may be used on other vehicles, such as trains or ships, or even with stationary structures.

Figure 1:
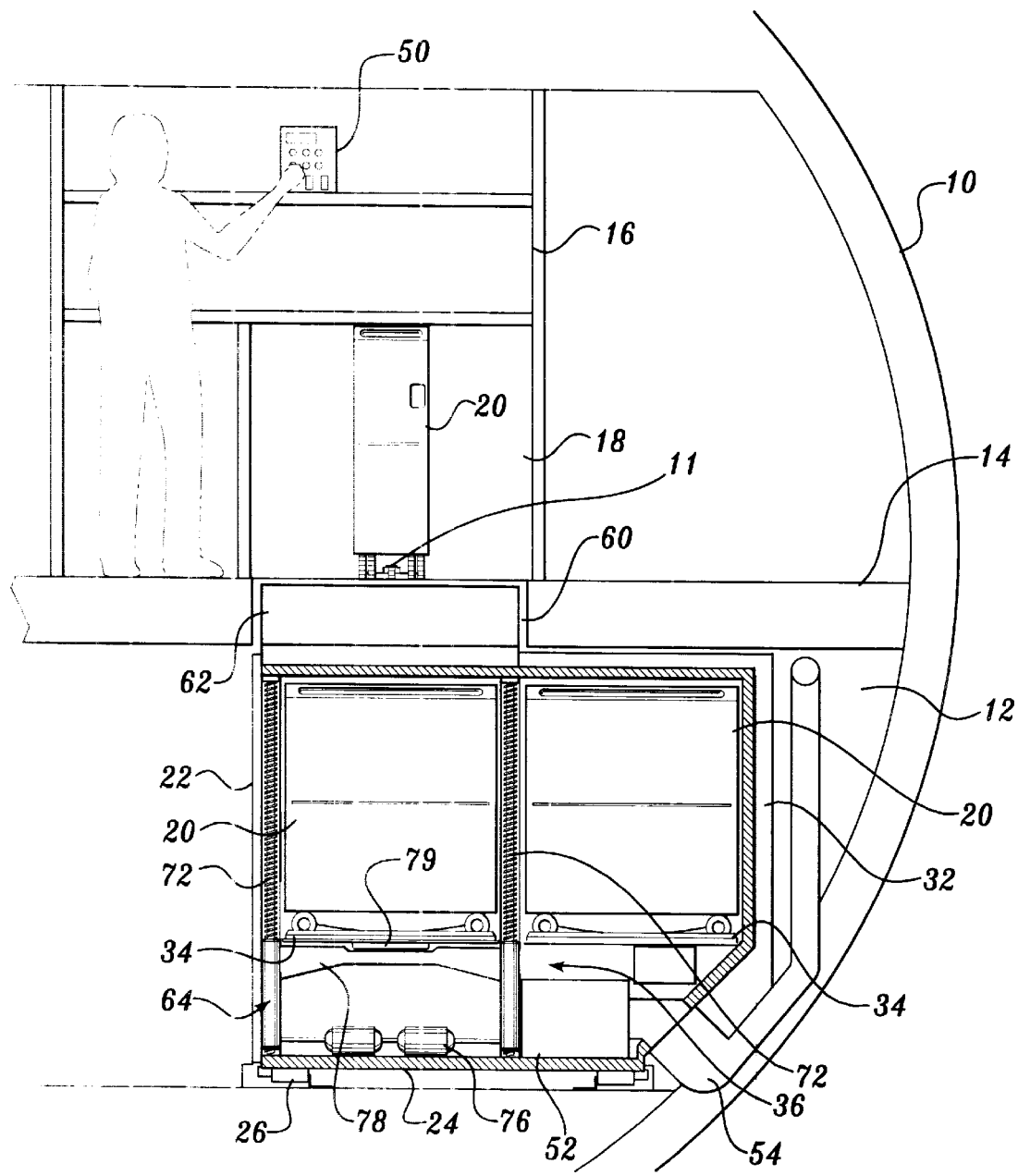
FIG. 1 is a cross-sectional elevation view of an aircraft fuselage showing one embodiment of a galley-cart storage system formed in accordance with the present invention.

Referring to FIG. 1, an aircraft fuselage 10 typically contains a lower lobe 12 located below a passenger deck 14. A galley station 16 is located on the passenger deck 14 and includes an enclosure 18 within which galley-carts 20 are held. Passenger cargo is typically stored within the lower lobe. In some cases, the cargo is first placed in a larger, palletized, cargo container (not shown) which is sized to fit precisely within all, or a portion, of the lower lobe. The cargo containers are quickly loaded and unloaded using heavy equipment loading devices (not shown).

Figure 2:
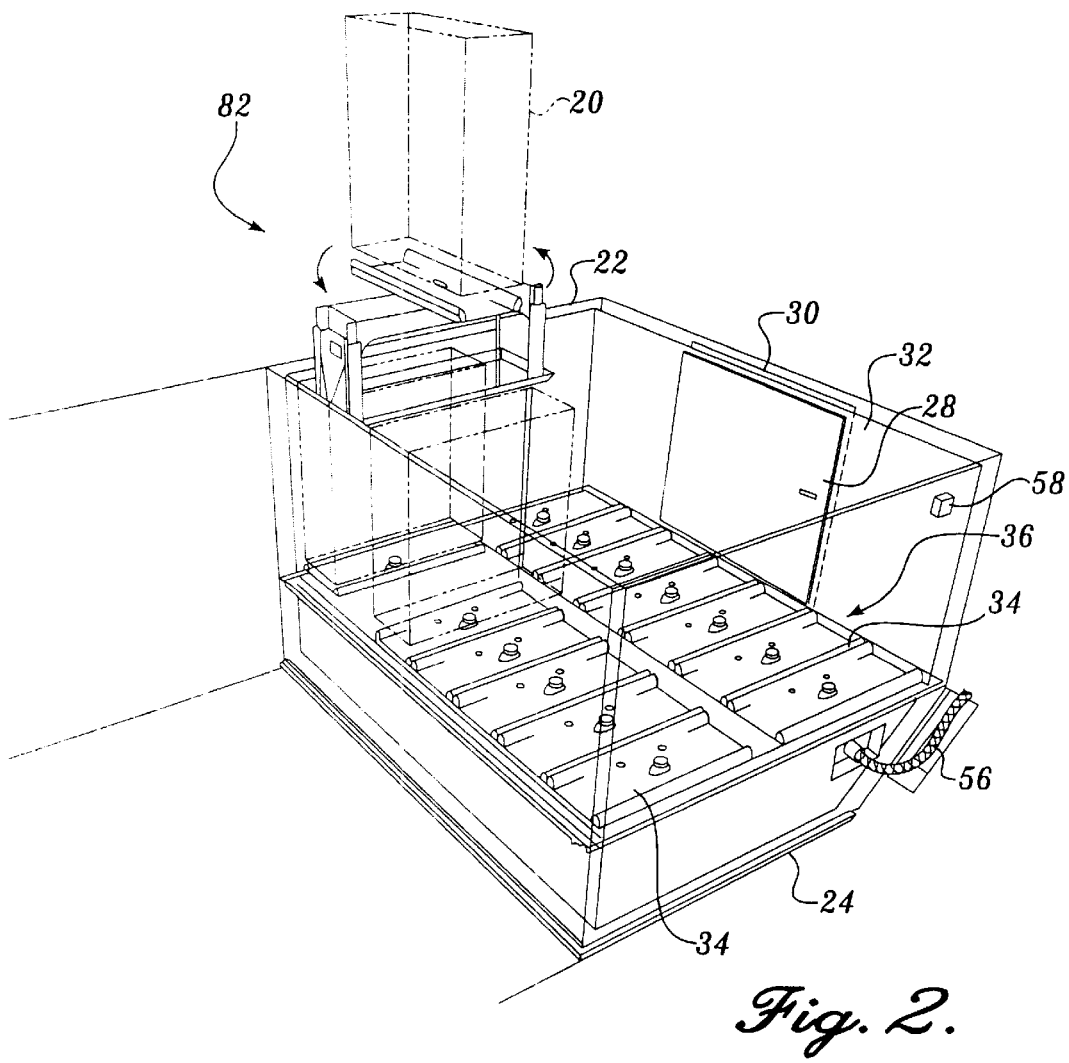
FIG. 2 is a schematic longitudinal perspective view of portions of the system of FIG. 1.

The present invention storage system includes a galley-cart container 22 of generally rectangular shape. The container is preferably palletized so that it too may be quickly loaded and unloaded into the lower lobe. See container bottom surface 24. Locking mechanisms 26 are available to secure the unit 22 within the lower lobe 12. As an alternative, the container 22 may be formed so that it is permanently affixed within the lower lobe 12 instead of being removable. In the embodiment of FIG. 2, the container includes doors 28 and 30 and the adjacent fuselage surface includes a conventional pressurized loading hatch (not shown). For embodiments in which the container 22 is permanently constructed within the lower lobe 12, these doors may be used to load and unload galley-carts from the container.

The container is sized to accommodate a predetermined maximum number of galley-carts in lateral rows at a predetermined storage height. The galley-carts are positioned side-by-side within each row. Any number of lateral rows may be used and accommodated by the system. A full size container, for instance, may be made to hold up to four lateral rows of seven carts each, for a total of 28 carts. Movement within the container when multiple rows are used is accomplished using a predefined sequential path, e.g., a rectangular pattern or other looping course. As shown in the embodiment of FIG. 1, the rows are preferably oriented to extend in a longitudinal direction relative to the aircraft fuselage. In most arrangements, it will be necessary to have one or more empty pallet spaces within the container in order to accommodate pallet and cart movement. This allows for a sequential movement of carts so that there are no bindings nor collisions. It is possible to initially fully load the container with pallets, but in general, in order for movement to occur, at least one of the pallets should be removed.

The galley-carts 20 are conventional objects having a size of approximately 12 inches by 34 inches by 40.5 inches. The container 22 includes an interior region defined by insulated walls 32. In one embodiment, the container is a unitary object and can be completely sealed off from the other cargo areas and from the galley as well. Depending on the application, this may be important in controlling fire and smoke. It is also useful in order to improved temperature control within the container 22. As shown, the container is tall enough to accommodate the upright galley-carts. The galley-carts 20 are each securable to a cart pallet 34 via standard tie-down fittings 11, e.g., a conventional mushroom fitting.

Referring to FIG. 2, the system includes an elevated transfer system 36 located within the lower portion of the container, below the predetermined galley-cart storage height. The transfer system 36 is responsible for moving galley-carts within the container. More particularly, the transfer system 36 moves cart pallets 34, which may or may not have a galley-cart 20 placed thereon. Various arrangements of transfer systems may be used. Two arrangements are described herein. A first general embodiment of an elevated transfer system is shown in FIGS. 1–4, and a second general embodiment is shown in FIG. 5.

Figure 3:
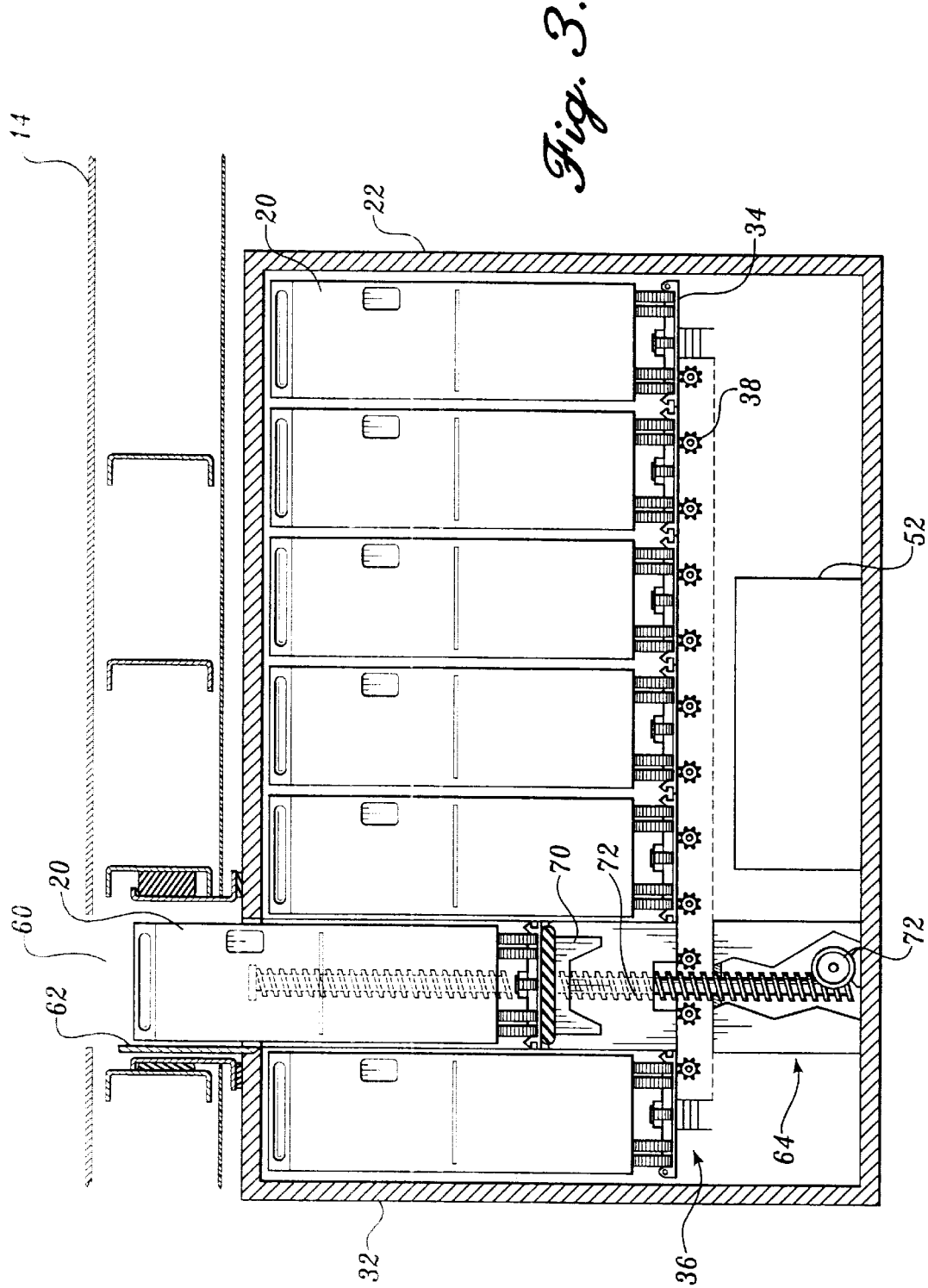
FIG. 3 is a side elevation view of the container and elevator of FIG. 1.
Figure 4:
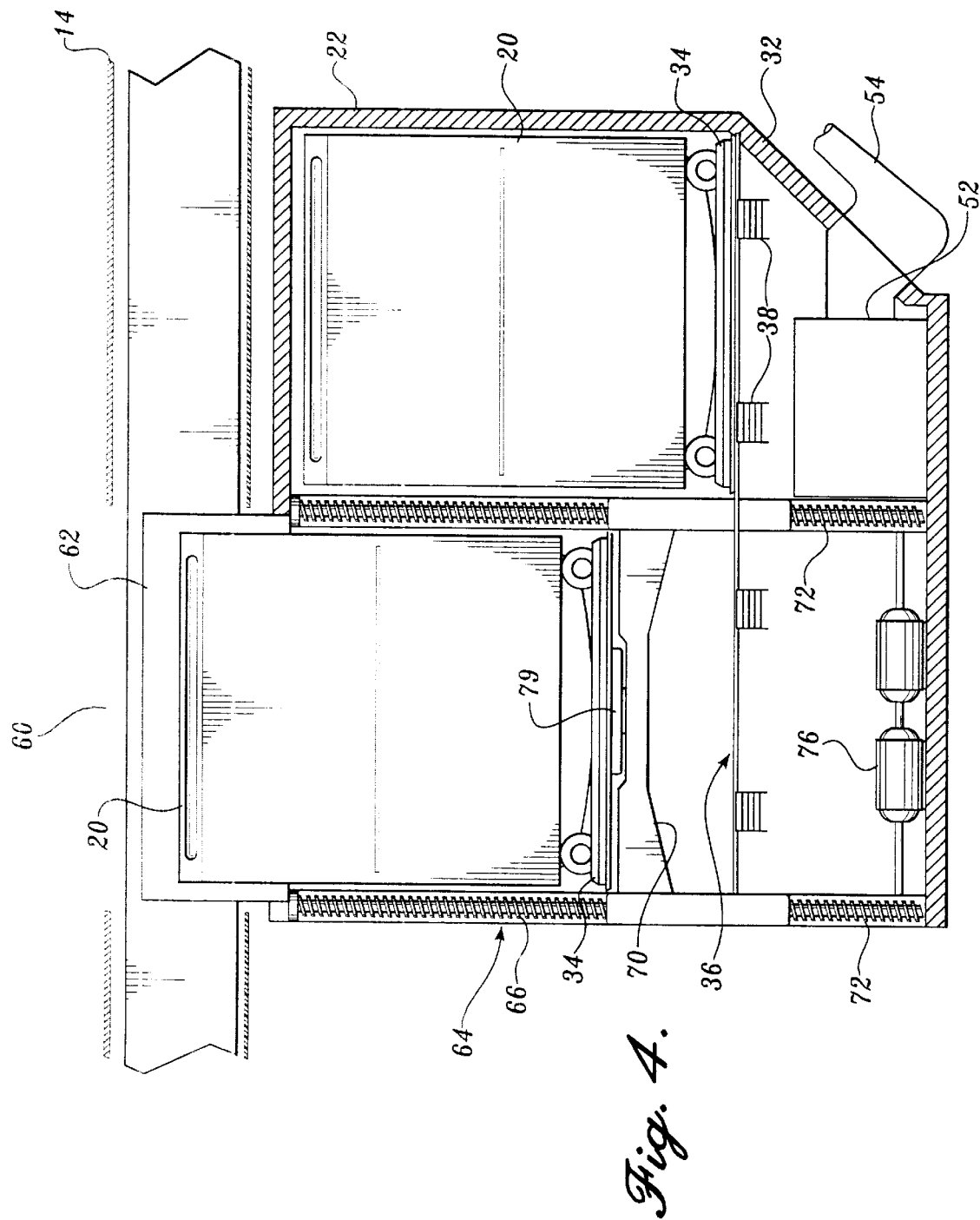
FIG. 4 is an end elevation view of the container and elevator of FIG. 3.

Referring to FIGS. 3 and 4, the elevated transfer system 36 includes a plurality of drive sprockets 38 located laterally throughout the container at just below the predetermined galley-cart storage height. Each pallet 34 includes a rack, or grid, machined into its underside and formed to continuously engage one or more of the sprockets in both longitudinal and lateral directions. A pulley system or other drive mechanism synchronously rotates the sprockets 38 to simultaneously move the pallets and carts.

Figure 5:
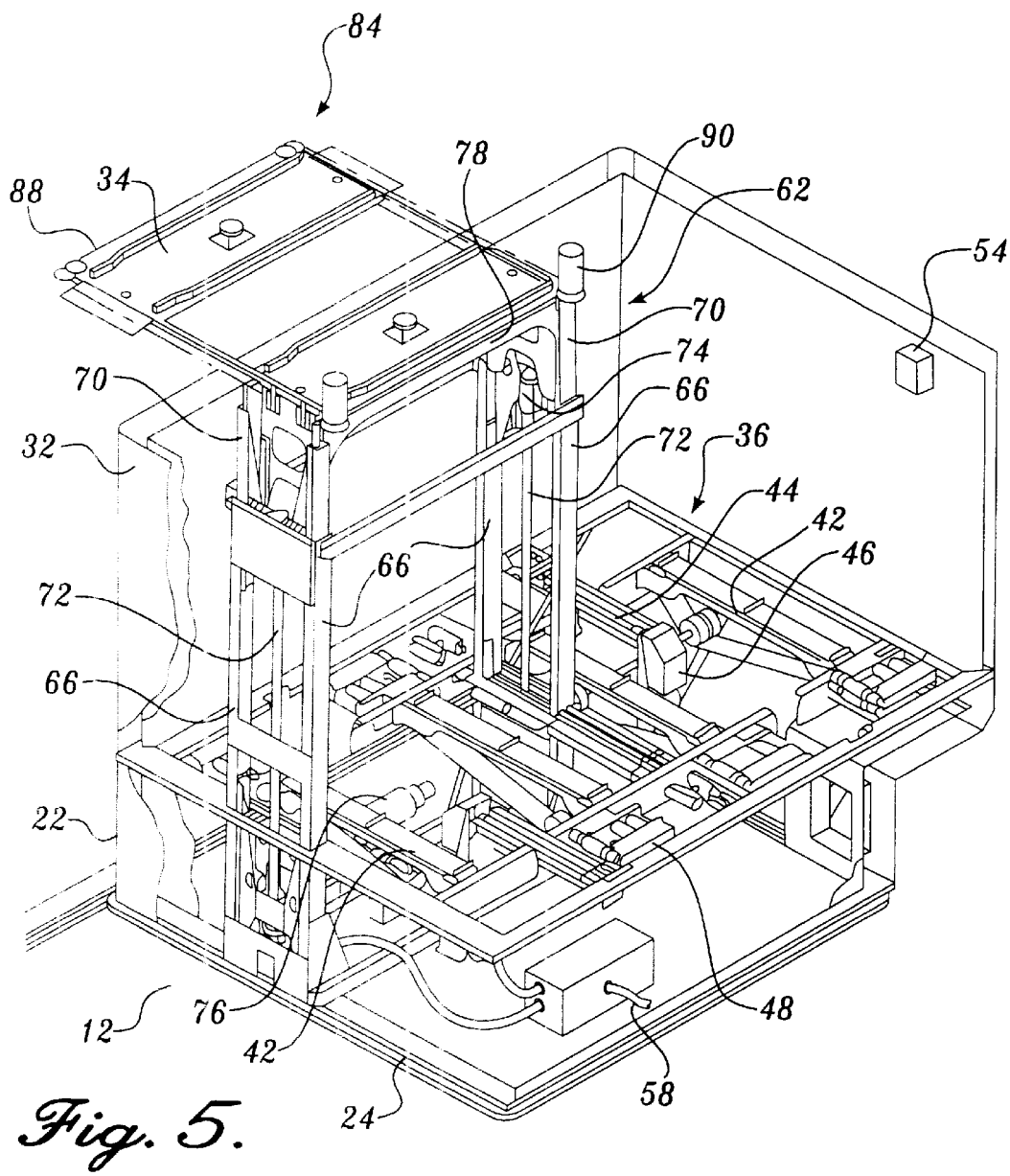
FIG. 5 is a longitudinal perspective view of portions of an alternative drive system and elevator formed in accordance with the present invention.

FIG. 5 illustrates an embodiment of a transfer system having several belts 42, one or more linear pushers 44 driven by electric motors 46, and several powered rollers 48. The belts 42 include cogs to keep the pallets in a parallel orientation when moving laterally. The linear pushers 44 are used to power the lateral motion of the belts 42 and their respective pallets 34. The powered rollers 48 are used to move the pallets in a transverse direction. The transfer system components are connected to and supported by the container's main structural elements. The cart pallets are not affixed to the belts, but instead only rest upon them, moving in a spaced and controlled manner as the belts rotate. The linear pusher 44 (also called a ball screw pusher) moves the cart pallets 34 longitudinally one pallet width per stroke. Several powered rollers 48 accomplish sideways galley-cart translation within the container 22. As will be appreciated by those skilled in the art, other transfer systems may be used. An important feature of the transfer system 36 is the ability to move cart pallets 34 in a predefined pattern within the container 22.

The transfer system 36 further includes an electronic control system with at least one control panel 50 located at the galley station 16. See FIG. 1. The control panel 50 is electronically linked to the various system components to allow an operator to control the translation of pallets (and their associated galley-carts) and to control the temperature and other environmental aspects within the container 22.

As shown in FIGS. 1, 3, and 4, a heat exchanger 52 is located within the container below the cart pallets and transfer system. Intake and exhaust piping 54 is provided as well. Electricity is available via cables 56 connected between the container 22 and the aircraft's onboard electrical system (not shown). See FIGS. 2 and 5. A temperature sensor 58 is positioned within the container 22. In one embodiment, the temperature sensor is in feedback communication with the heat exchanger 52 so that the heat exchanger 52 can be made to automatically adjust the temperature of the interior of the container 22. The temperature sensor and its setting are preferably linked to the control panel for display and for manipulation by an operator.

Referring to FIGS. 3 and 4, an upright passage 60 extends between the container 22 and the galley station 16. The container 22 preferably includes a door 62 to close off the passage for fire safety and temperature control of the container. A cart elevator 64 extends vertically within the passage to connect the galley station 16 with the container 22. Referring to FIG. 5, the elevator 62 encloses a generally rectangular space defined by four support rails 66. One rail is located at each corner of the space and is fixedly attached to the container structure itself.

The support rails guide a pair of rigid end carriers 70 up through the elevator passage 60 and into the galley station 16. The support rails 66 preferably include a low friction material such as Teflon, rollers, or bearings. By reducing friction, the end carriers translate up and down the rails more easily during use. The end carriers are each attached to a vertical drive screw 72 via a ball nut assembly 74, or the like. There is a drive screw located at each end of the elevator space, between the end support rails. One or more electric motors 76 are provided to synchronously rotate the drive screws during use, e.g., in worm-gear fashion or other gear configuration. The motors are located in the lower portion of the container. The motors rotate the drive screws which in turn causes corresponding vertical movement of the ball nut assembly and end carriers along the drive screws.

Also included in the elevator is a platform 78 connected between the pair of end carriers 70. During use, a pallet 34 is placed on top of the platform 78 and supported there during vertical translation. In this manner, the cart pallet 34 are raised and lowered between the container 22 and the galley station 16. In an alternative embodiment, the platform includes a cart interface member adapted to mate securely with the lower end or surface of a cart pallet.

During use, the end carriers guide the platform within the passage in going between the container and the passenger deck. In one embodiment, each end carrier includes two pinion gears. When the carrier nears the top of its travel, the pinion gears engage a rack on the support rails and a rack on the platform. This provides the extra travel necessary to lift the cart pallet to the passenger deck level. This is a double rack and pinion configuration. Other arrangements may be used. What is important is that the elevator provide the mechanisms necessary to project the pallet and cart beyond the top of the container, through the floor thickness, and to the top of the deck upper surface, irregardless of the dimensions involved.

Depending on the relative placement and orientation between the container elevator and the galley station, it may be necessary in some cases to include an additional mechanism to correctly position and orient the galley-cart at the galley station. In the embodiment of FIG. 2, the elevator includes a rotatable pallet arrangement 82. When a full galley-cart is needed from the container, a full cart is positioned (along with its corresponding pallet) onto the elevator platform within the container. The control system is used to raise the platform and its supported cart and pallet using the elevator. Once the platform reaches its fully raised position, the operator and/or control system may then rotate the cart and pallet 90 degrees about a pivoting top plate 79. (See FIG. 1 also.) Once transverse, the operator may then roll the galley-cart off of the pallet and out of the elevator. The pallet that is still positioned on the elevator platform is then ready to receive an empty galley-cart and be rotated 90 degrees back into the elevator, where it is translated vertically downward into the container for storage. Alternatively, a conventional ball-bearing mat and guides may be located on the galley floor to facilitate cart rotation.

In the embodiment of FIG. 5, the elevator includes a lateral translation arrangement 84. As the platform reaches the fully raised position in the elevator, locator pins on the elevator are displaced (or replaced) by locator pins on a lateral cable 88 (or chain). Motors 90 rotate the cable, thereby moving the combination of cart and pallet sideways, to a position from which the cart may be released from the pallet and rolled away. The pallet may be returned to the container with or without an empty cart thereon.

The present invention allows for efficient use of aircraft space and the ability to easily provide extra provisioning as necessary. Prior to departure, the container 22 is filled with full galley-carts and loaded into the cargo compartment. When an operator requires a full galley-cart, the operator uses the control system to raise a full cart to the passenger deck via the elevator. The galley-cart is released from the pallet and available for service.

An empty galley cart can then be loaded into the elevator and lowered for storage in the container. The operator also uses the control system to activate the transfer system, thereby shuffling galley-carts within the container as necessary. In particular, the transfer system moves the empty galley-cart with its associated cart pallet out of the elevator while simultaneously moving a full galley-cart with its associated cart pallet into the elevator. When the unused cart is properly positioned, the control system can be used to raise it within the elevator and the cycle is repeated. When all of the full galley-carts have been removed from the container and replaced with empty galley-carts, the operation is complete.

As will be appreciated from a reading of the above, the present invention galley cart storage system optimizes airplane galley volume with little or no impact on normal galley operations. The system further improves the efficiency of the galley by eliminating empty galley-carts from the passenger deck. In doing so, the present invention uses less passenger deck space. If the freed space is used to accommodate additional passengers, the present invention may have a beneficial impact on an operator's revenue. Likewise, the present invention lower lobe container can be used to increase galley-cart storage space. This may make it possible to now provide food service in those smaller aircraft intending to go longer distances.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In an aircraft having a lower lobe area and a passenger deck with a galley station, an improvement comprising an automated lower lobe galley-cart storage system including:

(a) a container sized to fit within the lower lobe area and to hold a predetermined maximum number of galley-carts in lateral rows, each row having a plurality of galley-carts positioned side-by-side;

(b) an elevated transfer system located within the container and including a control system with a control panel located at the galley station;

(c) an upright passage extending between the container and the galley station;

(d) a cart elevator located within the container and extendable vertically from the container, through the upright passage, and into the galley station;

(e) a number of cart pallets equal to or less than the predetermined maximum number of galley-carts, the cart pallets being located laterally within the container on the elevated transfer system, the elevated transfer system arranged to move the cart pallets in a predefined pattern that passes through the cart elevator, the cart elevator being arranged to lift and lower at least one of the number of cart pallets; and (f) a heat exchanger located within the container generally below the elevated transfer system;

wherein during use, an operator uses the control system to retrieve unused galley carts from the container and store used galley-carts in their place; this operation occurring by the operator using the control system to operate the transfer system to move cart pallets along the predefined pattern such that a cart pallet with an unused galley-cart is located in the elevator, once at the elevator, the control system is used to operate the elevator to lift the pallet and corresponding unused galley-cart through the passage and into the galley station, once at the galley station, the unused galley-cart is moved from the pallet; a used galley-cart may be returned to the container by reverse sequence; and wherein the elevated transfer system includes a plurality of drive sprockets located throughout the container and a pulley system to synchronously rotate the plurality of drive sprockets; and wherein each cart pallet includes a rack affixed to its underside and formed to continuously engage one or more of the sprockets in both longitudinal and lateral directions.

2. The storage system of claim 1, wherein the container is a palletized container unitarily loadable and unloadable from the lower lobe.

3. The storage system of claim 1, wherein the container includes a side wall having a door and wherein the aircraft lower lobe includes a fuselage wall with a loading hatch, the container side wall door being located adjacent to the fuselage loading hatch; wherein on ground, the loading hatch may be used to extract and replenish galley carts within the container.

4. The storage system of claim 1, wherein container is insulated and the control system includes a temperature control system connected to the heat exchanger.

5. The storage system of claim 1, wherein the galley-carts are securable to the cart pallets via tie-down fittings.

6. The storage system of claim 1, wherein the elevated transfer system includes an endless belt, a linear pusher driving the endless belt, and a powered pusher; the belt and linear pusher being located in the container and provided to move the cart pallets in a lateral direction; the powered pusher being located in the container and provided to move the cart pallets in a transverse direction.

7. The storage system of claim 1, wherein the cart elevator includes four upright support rails defining a generally rectangular space, a pair of upright drive screws located opposite one another between pairs of support rails, a pair of rigid end carriers located opposite one another and rotatably connected to the drive screws, the end carriers being translatable along the support rails, a motor for axially rotating the drive screws, and a lateral platform extending between the end carriers and capable of supporting a pallet and its corresponding galley-cart.

8. The storage system of claim 1, wherein the container includes a door at the location of the passage in order to close off the container.

9. The storage system of claim 1, wherein the galley station includes a rotatable pallet arrangement having an elevator platform that includes a pivoting top plate upon which a cart pallet rests; during use, when the elevator is in its fully raised position with the cart pallet and corresponding galley-cart located on the elevator platform, an operator may rotate the cart pallet and its corresponding galley-cart using the top plate from an aligned position on the platform to a transverse position on the platform; the operator then rolling the galley-cart off of the pallet for use.

10. The storage system of claim 1, wherein the container is sized to hold the galley-carts in two lateral rows, the elevated transfer system arranged to move the cart pallets in an endless loop pattern.

11. The storage system of claim 10, wherein the two rows of galley-carts extend longitudinally within the container relative to the aircraft.

12. In an aircraft having a lower lobe area and a passenger deck with a galley station, an improvement comprising an automated lower lobe galley-cart storage system including:
(a) a container sized to fit within the lower lobe area and to hold a predetermined maximum number of galley-carts in lateral rows, each row having a plurality of galley-carts positioned side-by-side;
(b) an elevated transfer system located within the container and including a control system with a control panel located at the galley station;
(c) an upright passage extending between the container and the galley station;
(d) a cart elevator located within the container and extendable vertically from the container, through the upright passage, and into the galley station;
(e) a number of cart pallets equal to or less than the predetermined maximum number of galley-carts, the cart pallets being located laterally within the container on the elevated transfer system, the elevated transfer system arranged to move the cart pallets in a predefined pattern that passes through the cart elevator, the cart elevator being arranged to lift and lower at least one of the number of cart pallets; and
(f) a heat exchanger located within the container generally below the elevated transfer system;
wherein during use, an operator uses the control system to retrieve unused galley carts from the container and store used galley-carts in their place; this operation occurring by the operator using the control system to operate the transfer system to move cart pallets along the predefined pattern such that a cart pallet with an unused galley-cart is located in the elevator, once at the elevator, the control system is used to operate the elevator to lift the pallet and corresponding unused galley-cart through the passage and into the galley station, once at the galley station, the unused galley-cart is moved from the pallet; a used galley-cart may be returned to the container by reverse sequence; and
wherein the galley station includes a lateral translation arrangement having cables with locator pins and a motor to move the cables in an endless loop; wherein during use, as the platform reaches the raised position in the elevator, the motor rotates the cable and the locator pins urge the cart pallet and its corresponding galley-cart laterally from the platform.

13. An automated galley-cart storage system for use in storing and retrieving a predetermined maximum number of used and unused galley-carts, the system comprising:
(a) a container sized to hold the galley-carts in lateral rows, each row having a plurality of galley-carts positioned side-by-side;
(b) an elevated transfer system located within the container and including a control system with a control panel located outside of the container;
(c) an upright passage extending between the container and an upper level;
(d) a cart elevator located within the container and extendable vertically from the container, through the upright passage, and into the upper level;
(e) a number of cart pallets equal to or less than the predetermined maximum number of galley-carts, the cart pallets being located laterally within the container on the elevated transfer system, the elevated transfer system arranged to move the cart pallets in a predefined pattern that passes through the cart elevator, the cart elevator being arranged to lift and lower at least one of the number of cart pallets; wherein galley-carts are positionable on the cart pallets within the container; and
(f) a heat exchanger located within the container generally below the elevated transfer system;
wherein during use, an operator uses the control system to retrieve unused galley carts from the container and store used galley-carts in their place; and
wherein the elevated transfer system includes a plurality of drive sprockets located throughout the container and a pulley system to synchronously rotate the plurality of drive sprockets; and wherein each cart pallet includes a rack affixed to its underside and formed to continuously engage one or more of the sprockets in both longitudinal and lateral directions.

14. The storage system of claim 13, wherein the elevated transfer system includes an endless belt, a linear pusher driving the endless belt, and a powered pusher; the belt and linear pusher being located in the container and provided to move the cart pallets in a lateral direction; the powered pusher being located in the container and provided to move the cart pallets in a transverse direction.

15. The storage system of claim 13, wherein the cart elevator includes four upright support rails defining a generally rectangular space, a pair of upright drive screws located opposite one another between pairs of support rails, a pair of rigid end carriers located opposite one another and rotatably connected to the drive screws, the end carriers being translatable along the support rails, a motor for axially rotating the drive screws, and a lateral platform extending between the end carriers and capable of supporting a cart pallet and its corresponding galley-cart.

16. The storage system of claim 13, wherein the container includes a door at the location of the passage in order to close off the container.

17. The storage system of claim 13, wherein the container is sized to hold the galley-carts in two lateral rows, the elevated transfer system arranged to move the cart pallets in an endless loop pattern.

* * * * *

UNITED STATES PATENT AND TRADEMARK OFFICE
CERTIFICATE OF CORRECTION

PATENT NO. : 6,454,208 B1  
DATED : September 24, 2002  
INVENTOR(S) : S.N. Nervig et al.

It is certified that error appears in the above-identified patent and that said Letters Patent is hereby corrected as shown below:

Title page,
Item [56], References Cited, U.S. PATENT DOCUMENTS, insert in appropriate order:
-- 5,314,143   5/1994   Luria
   6,059,229   5/2000   Luria --
*Assistant Examiner*, "Steven A Holzen" should read -- Steven A. Holzen --

Signed and Sealed this

Fifth Day of August, 2003

JAMES E. ROGAN
*Director of the United States Patent and Trademark Office*